United States Patent

Itabashi et al.

[11] Patent Number: 5,871,331
[45] Date of Patent: Feb. 16, 1999

[54] HYDRAULIC MACHINE

[75] Inventors: Shigeki Itabashi, Yamato; Masao Yamazaki, Kawasaki, both of Japan

[73] Assignee: Kabushiki Kaisha Toshiba, Kawasaki, Japan

[21] Appl. No.: 786,935

[22] Filed: Jan. 23, 1997

[30] Foreign Application Priority Data

Jan. 23, 1996 [JP] Japan .................................... 8-009466

[51] Int. Cl.⁶ .................................................... F04D 29/56
[52] U.S. Cl. .......................................................... 415/150
[58] Field of Search ................................... 415/148, 150, 415/151, 159, 160, 1

[56] References Cited

U.S. PATENT DOCUMENTS

| | | | |
|---|---|---|---|
| 4,406,577 | 9/1983 | Ichikawa | 415/1 |
| 4,547,123 | 10/1985 | Ichikawa | 415/1 |
| 4,575,307 | 3/1986 | Shinohara | 415/150 |
| 4,588,352 | 5/1986 | Kako | 415/1 |
| 4,692,090 | 9/1987 | Naka | 415/115 |

*Primary Examiner*—John Kwon
*Attorney, Agent, or Firm*—Foley & Lardner

[57] ABSTRACT

In a hydraulic machine, a stay ring is provided with an upper bearing and an intermediate bearing so that an upper spindle of a guide vane is supported thereon. A bottom ring is provided with a lower bearing so that a lower spindle of the guide vane is supported thereon. The hydraulic machine is designed so that a runner and the guide vane can be removed from the bottom side if the bottom ring and an upper draft tube are removed. The guide vane is supported on the stay ring so as to make a head cover compact and to be capable of lifting the head cover through an upper pit liner if the head cover is formed as an integral structure.

7 Claims, 13 Drawing Sheets

HYDRAULIC MACHINE

BACKGROUND OF THE INVENTION

1. Field of the Invention

The present invention relates to a hydraulic machine such as a hydraulic turbine, a pump and a reversible pump-turbine. More specifically, the invention relates to a hydraulic machine which can be easily disassembled and assembled.

2. Description of the Prior Art

Figure 15:
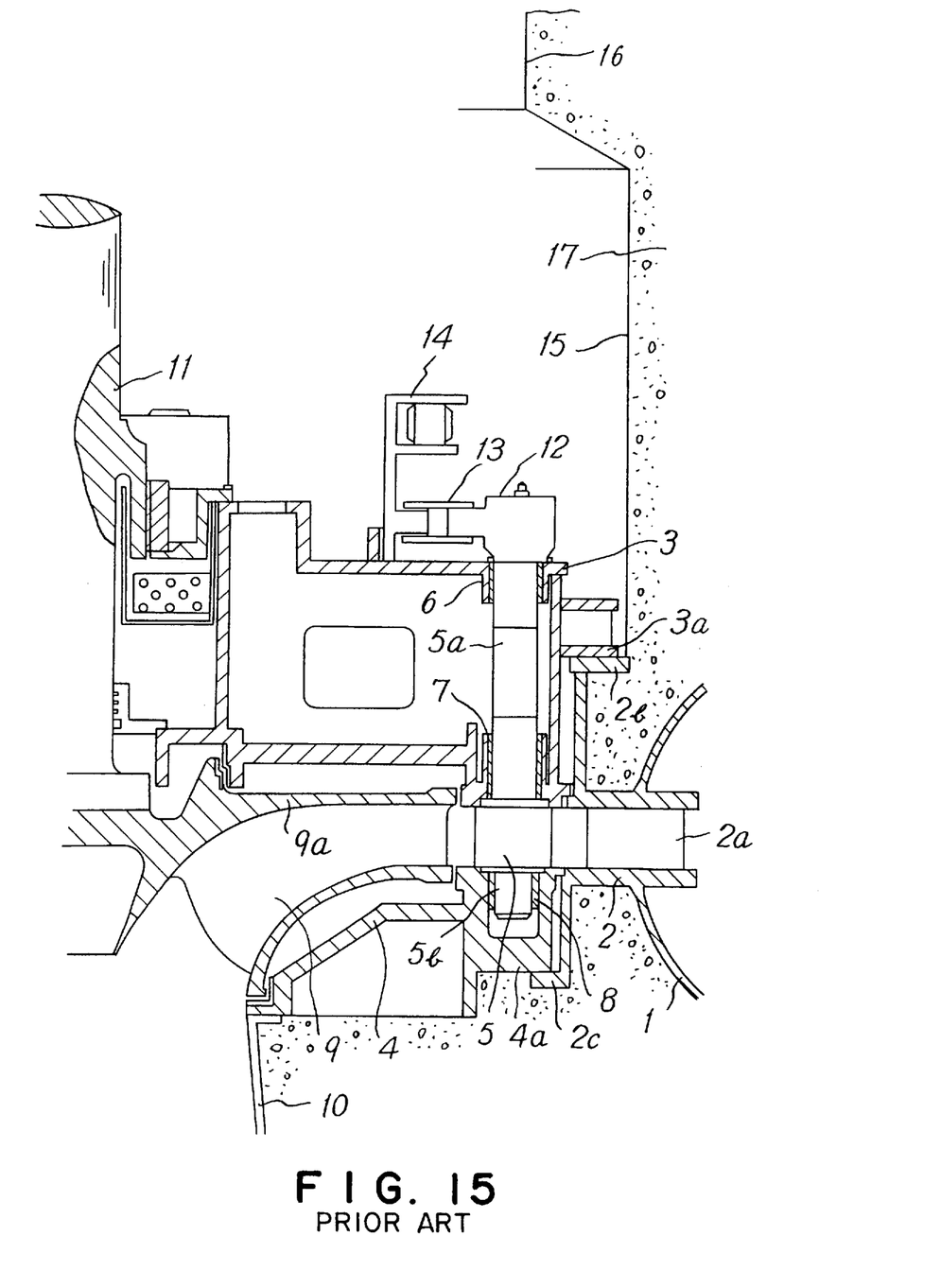
FIG. 15 is a sectional view illustrating a main portion of a conventional hydraulic machine.
Figure 16:
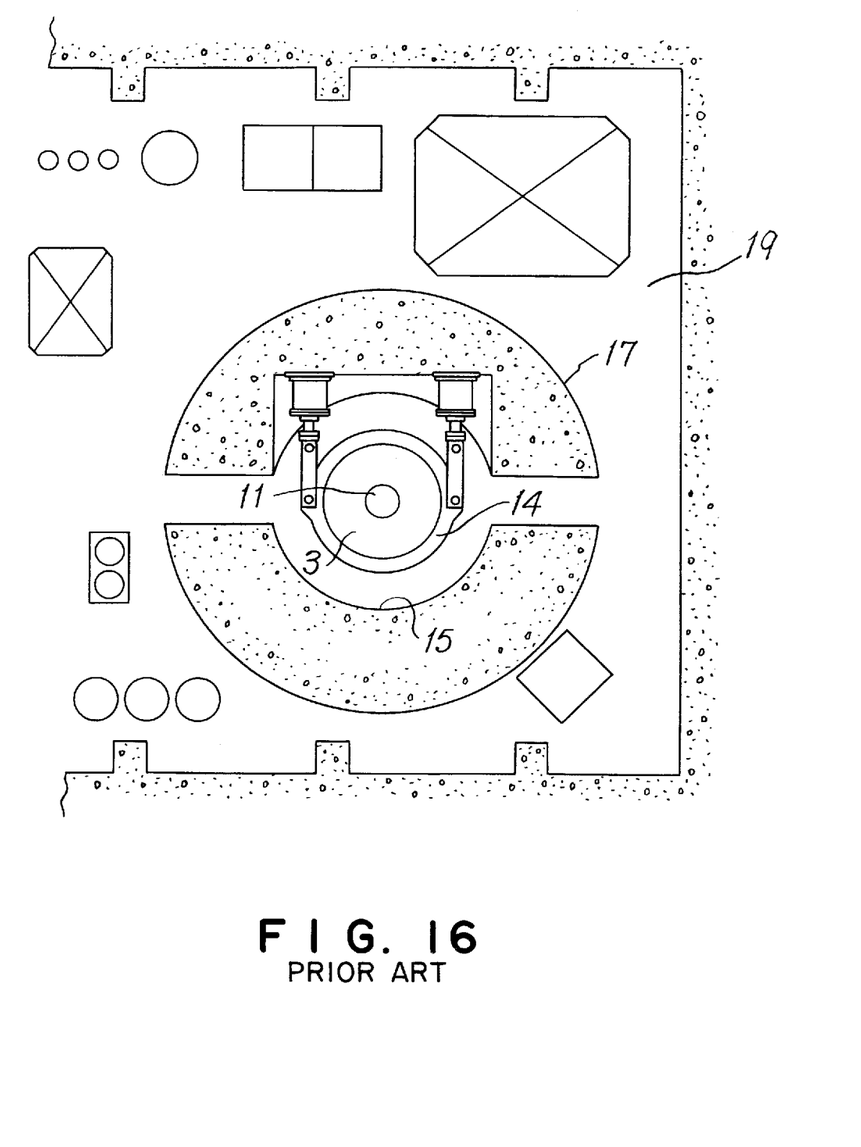
FIG. 16 is a plan view of the hydraulic machine of FIG. 15.

A typical hydraulic machine, such as a hydraulic turbine and a pump, is installed in a double-flooring type building or a barrel type building. FIG. 15 shows a conventional hydraulic machine installed in a barrel type building. This hydraulic machine comprises a spiral case 1 connected to a steel pipe which introduces water from an upper pond (not shown), a stay vane 2a arranged on the inner periphery of the spiral case 1, and a stay ring 2 which clamps the stay vane 2a from the upper and lower sides to form a passage. The stay ring 2 has an upper flange 2b and a lower flange 2c. On the stay ring 2, a head cover 3 having a head-cover flange portion 3a is mounted by connecting the head-cover flange portion 3a to the upper flange 2b by means of bolts. In addition, on the stay ring 2, a bottom cover 4 having a bottom-ring flange portion 4a is mounted by connecting the bottom-ring flange portion 4a to the lower flange 2c by means of bolts.

In the passage inside of the stay vane 2a and between the upper cover 3 and the bottom cover 4, a guide vane 5 is arranged so as to form a circular cascade. The guide vane 5 has an upper spindle 5a and a lower spindle 5b. The upper spindle 5a of the guide vane 5 is rotatably supported on an upper guide vane bushing 6 and an intermediate bearing 7, which are provided on the head cover 3. The lower spindle 5b is rotatably supported on a lower bearing 8 provided on the bottom cover 4. Water flow-regulated by the guide vane 5 flows into a runner 9, and water flowing out of the runner 9 passes through an upper draft tube 10 to be discharged from a draft tube liner to a tailrace. The runner 9 is connected to the lower end portion of a turbine main shaft 11. Rotational torque of the runner 9 is transmitted to a generator via the turbine main shaft 11 to generate electricity. The head cover 3 is formed with an outer-periphery seal on the side of a runner crown 9a. The head cover 3 is also provided with a guide vane arm 12, a guide vane ring 13 and a operating ring 14. Above the stay ring 2, a lower pit liner 15 and an upper pit liner 16 are provided to form a pit of the hydraulic turbine. As shown in FIG. 16, each of the pit liners 15 and 16 is provided with a concreted turbine barrel 17. This turbine barrel 17 is designed to sufficiently support thereon the weights of generator stationary and rotary portions loaded on the lower pit liner 15, the hydraulic thrust weight when being driven, and so forth. The size of a turbine room 19 is determined in view of the size of the turbine barrel 17 and the maintenance space for auxiliary machinery provided in the turbine room 19. In the hydraulic machine with the aforementioned construction, particularly in a generator for a large capacity of reversible pump-turbine, a generator lower bearing bracket is provided with a thrust bearing and a lower guide bearing. In order to enhance the rigidity of the generator lower bearing to prevent the deformation thereof if thrust weight is applied thereto, it is required to decrease the diameter of the generator lower bearing bracket. In order to decrease the diameter of the generator lower bearing bracket, the inner diameter of the upper pit liner 16, on which the lower bearing bracket is mounted, must be decreased.

Therefore, in conventional hydraulic machines, the head cover 3, which is a large structure of the hydraulic machine and which is required to be disassembled for maintenance, has a four-piece structure which can be divided into four pieces. In addition, the inner diameter of the upper pit liner 16 is determined to be a necessary and minimum size in which each divided pieces can be lifted. For that reason, the inner diameter of the upper pit liner 16 is less than the inner diameter of the lower pit liner 15. As mentioned above, the conventional head cover 3 has a four-piece structure. Therefore, in order to assemble the head cover 3, four pieces must be combined with each other on the guide vane 5 in a complicated process to fasten joint portions by means of bolts, and then, the fastened four pieces must be mounted on the upper spindle 5a of the guide vane 5. The head cover 3 must be assembled at a high level above the guide vane 5 and within a narrow pit while the heavy equipment is lowered through the narrow upper pit liner 16 by means of a crane. Therefore, the assembly work must be carefully performed by skilled persons for several days.

In a field assembly of a hydraulic machine, in order to align the stationary parts, the head cover 3 is first temporarily assembled to perform the alignment. After the temporary assembly and alignment are completed, the head cover 3 is disassembled to be lifted. Thereafter, the runner 9 and the turbine main shaft 11 are introduced, and then, the head cover 3 is assembled again to install the hydraulic machine on the site. For that reason, it takes about two weeks to perform the assembly, disassembly and re-assembly processes of the head cover 3. However, in recent years, in the field installation work, it is required to shorten the processes to early increase the quantity of power supply, so that it is greatly desired to shorten the assembly operation of the head cover 3.

In addition, since the head cover 3 is divided into four pieces, the number of days for manufacturing the head cover is 1.5 times as longer as that of an integral head cover, the cost thereof increases, and the structural strength thereof becomes weak. The outer diameter of the turbine barrel 17 is derived by adding, to the inner diameter of the lower pit liner 15, a necessary thickness of concrete, which can bear the weights of stationary parts and rotary portions of the generator, and the water thrust load produced when the hydraulic machine is actuated. The inner diameter of the lower pit liner 15 is greater than the outer diameter of the head cover 3 by a work space required for tools which fasten head-cover mounting bolts. Therefore, the outer diameter of the turbine barrel is increased, so that the maintenance space for auxiliary machinery on the turbine room floor is insufficient. In some cases, the floor size may be increased to increase the construction cost. In addition, as mentioned above, since the head cover 3 must be disassembled and assembled after it is temporarily arranged on the guide vane 5, it is required to secure a space in a vertical direction for arranging therein the divided pieces of the head cover 3. Therefore, the height of the lower pit liner 15 is so defined as to secure the space. The installation position of the generator is determined on the basis of the height of the lower pit liner 15. Therefore, even if the height of the generator is decreased and the height of the building is also decreased, it is not possible to lower the installation position of the generator unless the method for assembling the head cover 3 is changed, so that it is not possible to decrease the construction period and cost.

In addition, since the installation position of the generator is a high position, the turbine main shaft 11 and the generator shaft are long, so that the critical speed is decreased.

Therefore, it is required to enhance the rigidities of the shafts, e.g., by increasing the diameters of the shafts. Moreover, in a hydraulic machine, it is required to repair the runner 9 and the guide vane 5 due to cavitation damage and sedimentary friction while being actuated. When the runner 9 and the guide vane 5 are carried out for repair, it is required to disassemble the generator to lift the disassembled generator. Therefore, it is also required to disassemble a set of parts mounted on the head cover 3, so that the term of repairing work is remarkably increased. In particular, in recent years, as the capacity of the hydraulic machine is increased and the size thereof is decreased, the repairing interval is decreased due to cavitation damage and sedimentary friction, so that it is required to decrease the term of repairing work in order to improve the availability.

SUMMARY OF THE INVENTION

It is therefore an object of the present invention to eliminate the aforementioned problems and to provide a hydraulic machine wherein a guide vane can be disassembled and assembled from the side of a bottom ring. It is another object of the present invention to provide a hydraulic machine wherein a head cover has an integral structure so as to be capable of being directly lowered to be assembled, so that it is possible to remarkably decrease the term of field installation work and it is also possible to decrease the manufacturing period of time in a maker.

It is further object of the present invention to provide a hydraulic machine wherein parts thereof can be removed and carried out, without removing and carrying a generator.

In order to accomplish the aforementioned and other objects, according to one aspect of the present invention, there is provided a hydraulic machine installed in a barrel type building, comprising: a stay ring having a stay vane; a head cover and a bottom ring, which are arranged on an inner-periphery side of the stay ring; a guide vane arranged in a passage between the head cover and the bottom ring, the guide vane having an upper spindle and a lower spindle; a runner for converting energy of water flow-regulated by the guide vane; and a turbine main shaft rotating with the runner, wherein the stay ring has a bearing for supporting thereon the upper spindle, and the bottom ring has a bearing for supporting thereon the lower spindle. In this hydraulic machine, since the upper spindle of the guide vane is supported on the stay ring, it is possible to remove the guide vane from the side of the bottom ring regardless of the disassembly and assembly of the head cover. The stay ring may be formed with a runner-crown side outer-seal on the inner periphery thereof. Thus, it is possible to decrease the outer diameter of the head cover. The pitch circle of bolts for mounting the head cover may be arranged inside of the pitch circle of the guide vane, and the head cover may be connected to the stay ring by means of bolts. Thus, it is possible to decrease the inner diameter of a lower pit liner so that the lower pit liner is arranged in the vicinity of a guide vane arm. Therefore, it is possible to decrease the term of field installation work and to decrease the manufacturing period of time. In addition, it is possible to decrease the height of the lower pit liner, so that it is possible to decrease the size of the building. The head cover may comprise a bottom plate for defining a runner back-pressure chamber, an upper ring for supporting thereon a guide ring and a bearing stand, and a tapered cylindrical side plate for connecting the bottom plate to the upper ring, wherein a guide vane arm is provided on the bearing for supporting thereon the upper spindle. Thus, it is possible to make the head cover compact and simple, and to enhance the rigidity of the head cover. Therefore, if a load applied to the bottom plate by hydraulic pressure, a radial load applied to the upper ring by the bearing, an operation load applied by a guide-vane servomotor through the guide ring or the like is applied to the head cover, it is possible to decrease the deformation of the head cover and to enhance the reliability thereof.

According to another aspect of the present invention, there is provided a hydraulic machine installed in a barrel of a building, comprising: a stay ring having a stay vane; a head cover and a bottom ring, which are arranged on an inner-periphery side of the stay ring; a guide vane arranged in a passage between the head cover and the bottom ring; a runner for converting energy of water flow-regulated by the guide vane; and a turbine main shaft rotating with the runner, wherein an intermediate shaft having a predetermined length is detachably mounted on the turbine main shaft, and wherein a carrying passage, which extends toward a hatch for carrying the hydraulic machine in and out, is formed in the periphery of the barrel. Thus, it is possible to disassemble and carry parts of the hydraulic machine without removing and carrying the generator. The hatch may also serve to carry an inlet vale in and out. Thus, it is not required to provide an exclusive hatch for the hydraulic machine, so that it is possible to the building space.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to this specific embodiments, but are for explanation and understanding only. In the drawings.

DESCRIPTION OF THE PREFERRED EMBODIMENT

Figure 1:
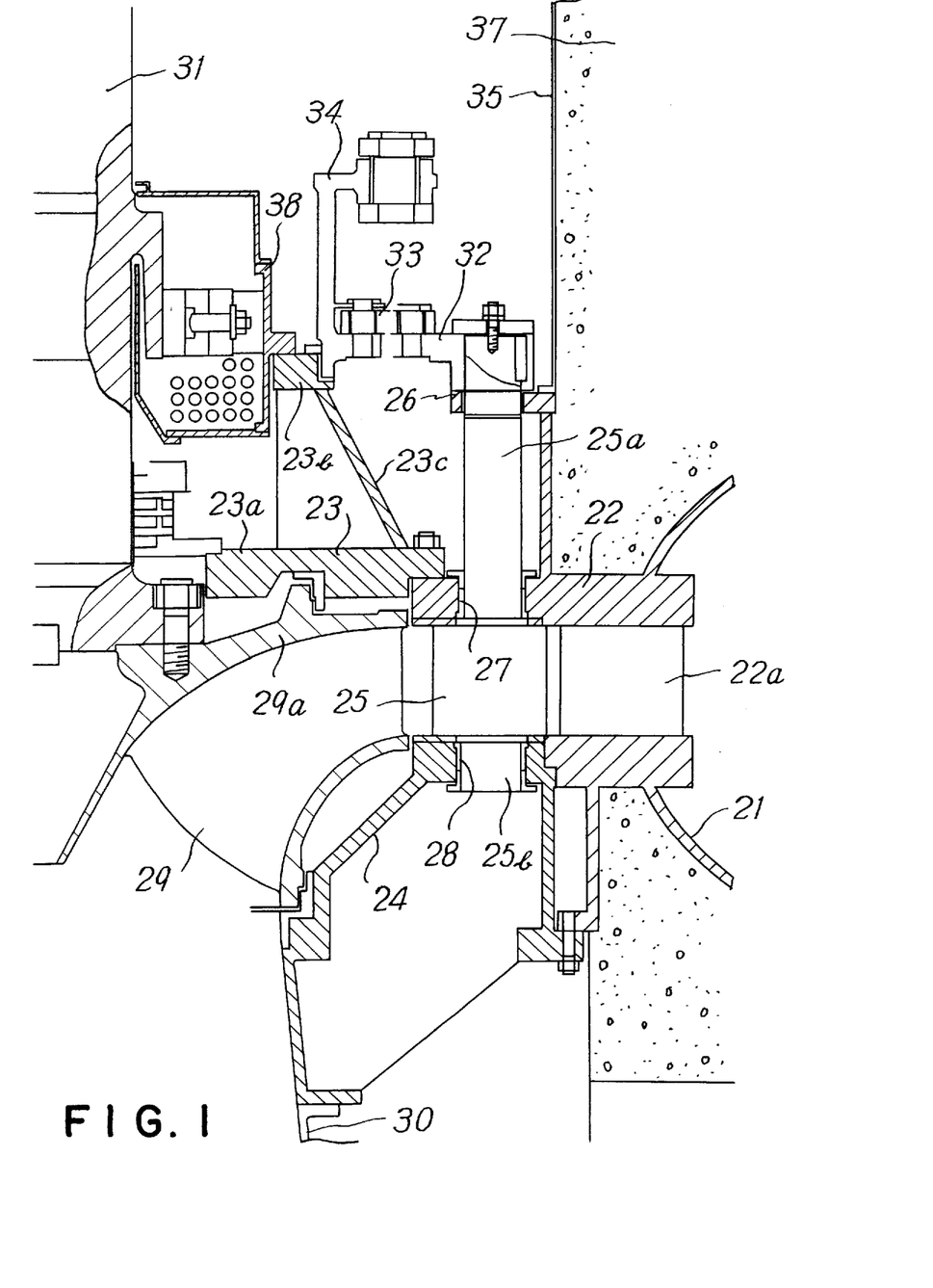
FIG. 1 is a longitudinal section illustrating a main portion of the first preferred embodiment of a hydraulic machine according to the present invention.
Figure 2:
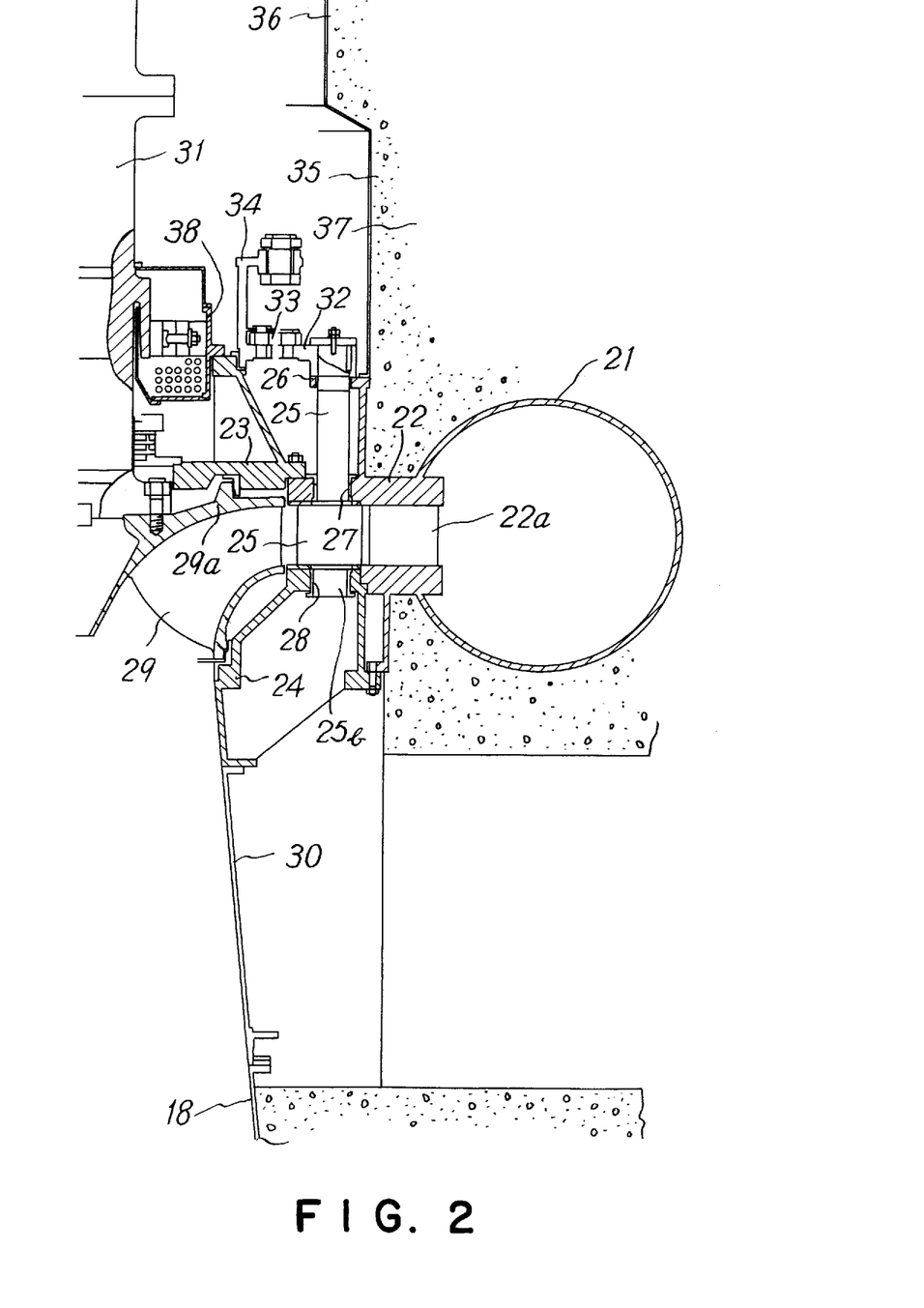
FIG. 2 is a longitudinal section illustrating a main portion of the first preferred embodiment of a hydraulic machine according to the present invention, similar to that of FIG. 1.

Referring now to the drawings, particularly to FIGS. 1 through 14, the preferred embodiments of a hydraulic machine according to the present invention will be described below. FIGS. 1 and 2 show the first preferred embodiment of a hydraulic machine according to the present invention. This hydraulic machine is installed in a barrel type building. The hydraulic machine comprises a spiral type spiral case 21 connected to a steel pipe which introduces water from an upper pond (not shown), and stay ring 22, which is arranged on the inner periphery of the spiral case 21 and which clamps a stay vane 22a from the upper and lower sides to form a passage. Inside of the stay ring 22, a head cover 23 and a bottom cover 24 are arranged on the upper and lower sides so as to face each other. The head cover 23 and the bottom cover 24 are connected to the stay ring 22 by means of bolts. A guide vane 25 is arranged in the passage inside of the stay vane 22a and between the head cover 23 and the bottom cover 24.

As shown in FIGS. 1 and 2, the guide vane 25 has an upper spindle 25a and a lower spindle 25b. The upper spindle 25a of the guide vane 25 is rotatably supported on an upper guide vane bushing 26 and an intermediate bearing 27, which are provided on the stay ring 22. The lower spindle 25b of the guide vane 25 is rotatably supported on a lower bearing 28 provided on the bottom cover 24. Thus, after an upper draft tube 30, which will be described later, and the bottom cover 24 are disassembled, the guide vane 25 can be removed from the lower side to be assembled, so that it has no influence upon the disassembly and assembly of the head cover 23.

As can be seen from FIGS. 1 and 2, water flow-regulated by the guide vane 25 flows into a runner 29, and then, water flowing out of the runner 29 passes through the upper draft tube 30, which is detachably connected to the bottom of the bottom cover 24, to be discharged from a draft tube liner 18 to a tailrace. As shown in FIGS. 1 and 2, the runner 29 is connected to the lower end portion of a turbine main shaft 31, so that rotational torque of the runner 29 is transmitted to a generator via the turbine main shaft 31 to generate electricity. The runner 29 has a runner crown 29a. The outer peripheral portion of the runner crown 29a faces the inner peripheral portion of the stay ring 22. This inner peripheral portion of the stay ring 22 provides an outer-periphery seal on the side of the runner crown 29a. The runner 29 can be disassembled either from the bottom side if the bottom cover 24 is removed, or from the upper side if the head cover 23 is removed. As shown in FIG. 1, the head cover 23 comprises a bottom plate 23a which defines a runner back-pressure chamber, an upper ring 23b which supports thereon a operating ring 34 and a bearing stand 38, a tapered cylindrical side plate 23c which connects the bottom plate 23a to the upper ring 23b. The head cover 23 is formed as an integral structure. The pitch circle of mounting bolts therefor is set to be inside of the pitch circle of the guide vane 25. Thus, the inner diameter of a lower pit liner 35, which will be described later, can be decreased so that the lower pit liner 35 is arranged in the vicinity of a guide vane lever 32. As shown in FIG. 1, the guide vane lever 32 is mounted on the upper guide vane bushing 26 arranged at the upper end of the stay ring 22. The guide vane lever 32 is connected to the operating ring 34 via a guide vane link 33. Above the stay ring 22, the lower pit liner 35 and an upper pit liner 36 are arranged to form a pit of the hydraulic turbine. On the outer-periphery side of these pit liners 35 and 36, a concreted turbine barrel 37 is provided. This turbine barrel 37 is designed to sufficiently support thereon the weights of generator stationary and rotary portions loaded on the lower pit liner 35, the hydraulic thrust weight when being driven, and so forth. Operation of the preferred embodiment of a hydraulic machine according to the present invention will be described below.

Figure 3:
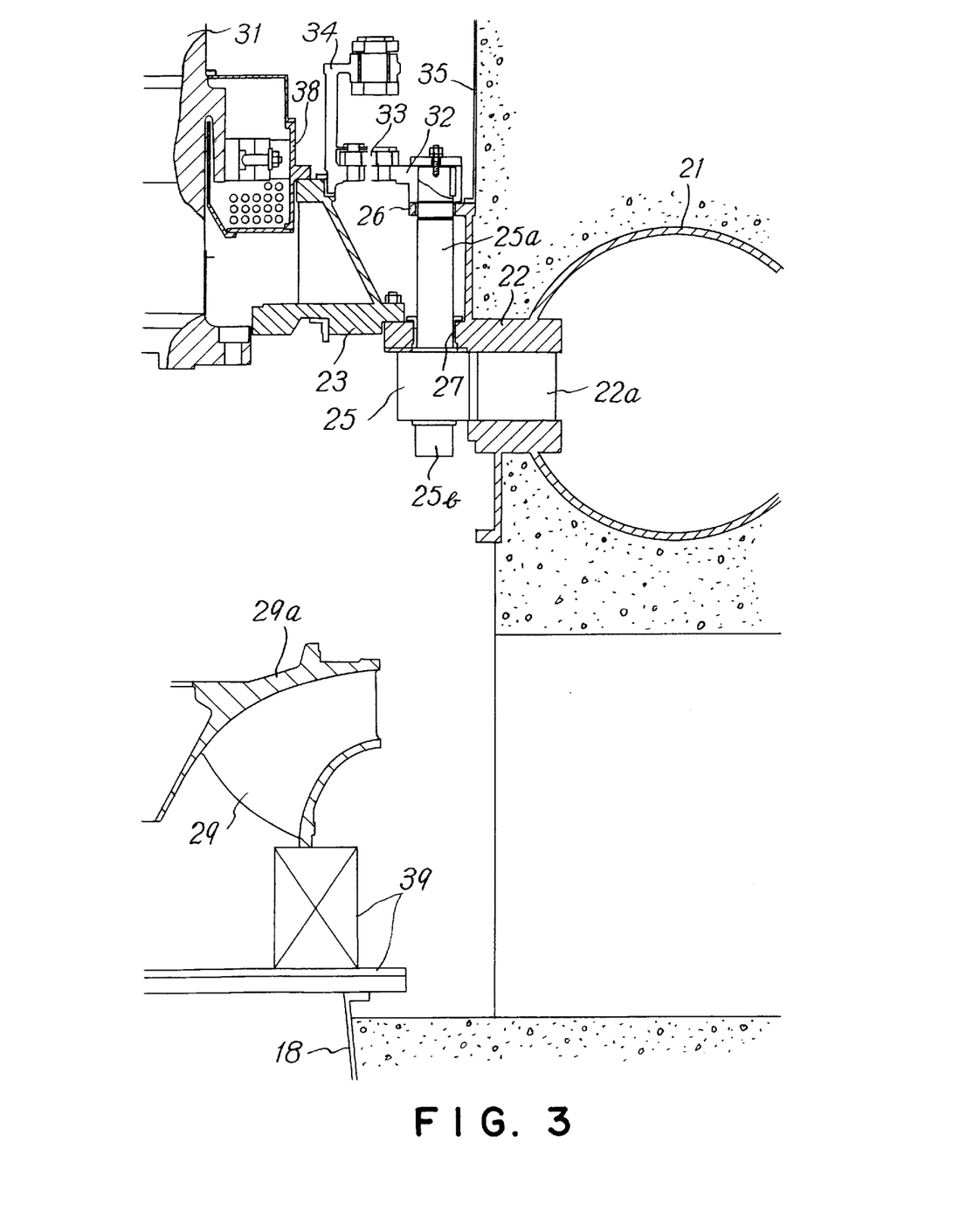
FIG. 3 is a longitudinal section corresponding to FIG. 2, which shows the state of the hydraulic machine when a runner is repaired.

In a case where the repairing of the runner 29 required due to cavitation damage and sedimentary friction is performed, the upper draft tube 30 is first removed and the bottom cover 24 is then removed as shown in FIG. 3. These removed parts are conveyed to the outside through a draft check passage. Then, a runner inspection frame 39 is installed on the draft tube liner 18. Thereafter, the runner 29 is removed from the turbine shaft 31 by removing coupling bolts, and the removed runner 29 is lowered to be put on the runner inspection frame 39. In this condition, the runner 29 is repaired.

Figure 4A:
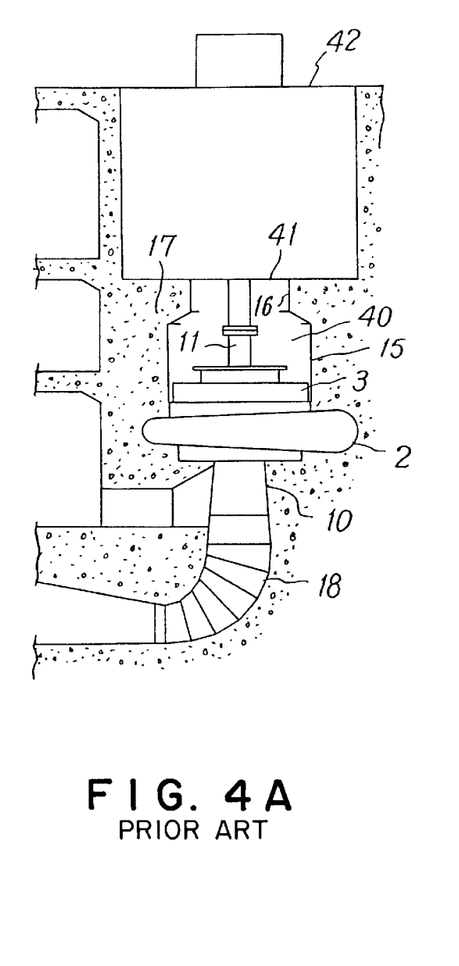
FIG. 4A is a view illustrating a conventional hydraulic machine which uses a divided type head cover.
Figure 4B:
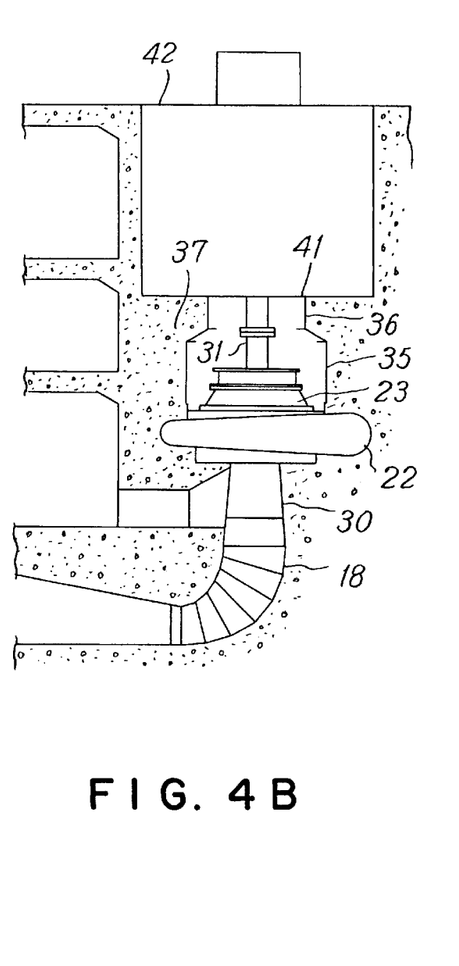
FIG. 4B is a view illustrating a hydraulic machine, according to the present invention, which uses an integral head cover.

FIGS. 4(a) and 4(b) show the comparison between the heights of a conventional hydraulic machine using a divided type head cover 3, and a hydraulic machine using an integral head cover 23 according to the present invention.

In the case of the conventional hydraulic machine shown in FIG. 4(a), since the head cover 3 must be assembled on the guide vane 3, a work space 40 is required. In view of this work space 40, the height of the lower pit liner 15 is determined. In addition, a lower-bracket installed plate 41 is determined by adding the thickness of concrete, which is necessary for the foundation of a generator lower bracket, to the height of the lower pit liner 15. On the basis of the lower-bracket installed plane 41, a generator floor plane 42 is determined. On the other hand, in the case of the hydraulic machine of the present invention shown in FIG. 4(b), the head cover 23 has a compact and integral structure so that it can be directly lifted through the upper pit liner 36. Therefore, it is not required to provide installation space above the guide vane 25, so that it is possible to decrease the height of the lower pit liner 35. As a result, it is also possible to lower the generator lower-bracket installed plane 41 and the generator floor plane 42, so that it is possible to decrease the construction cost for a hydraulic power plant.

Since the stay ring 22 is provided with the upper guide vane bushing 26 and the middle guide vane bushing 27, which support thereon the upper spindle 25a of the guide vane 25, it is possible to remove the guide vane 25 on the bottom side to repair the guide vane 25 after removing the bottom cover 24 and the upper draft tube 30. In addition, since the runner 29 can be removed on the bottom side to be repaired in the draft check passage, it is not required to disassemble the generator when the runner 29 is repaired.

Figure 5:
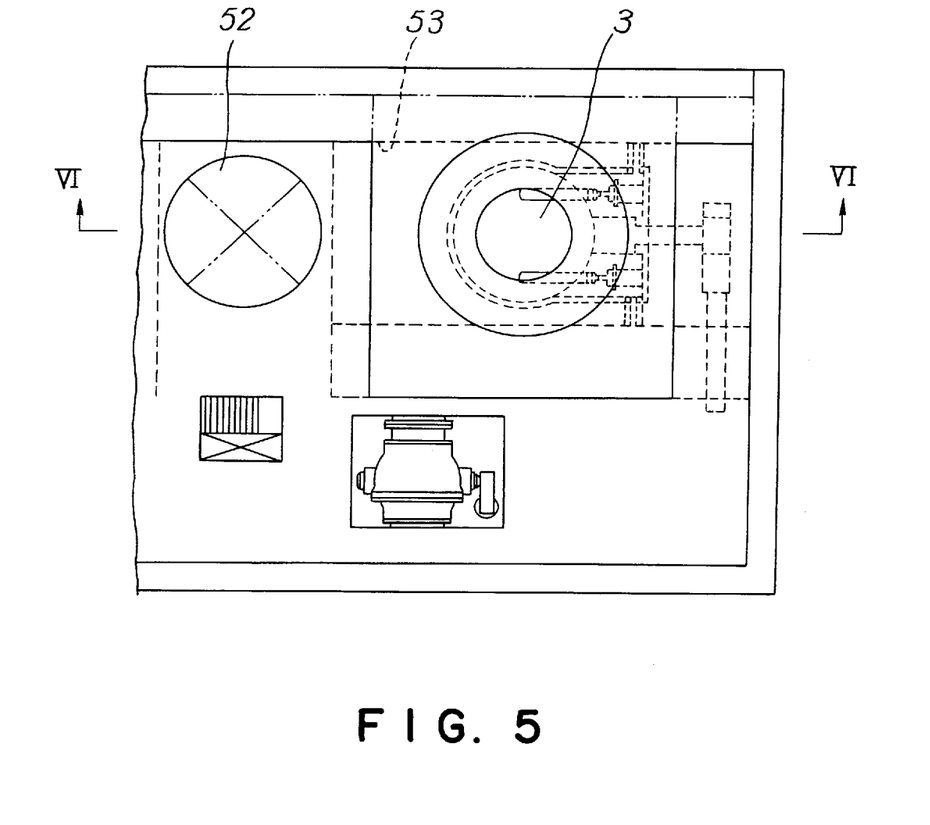
FIG. 5 is a plan view of the second preferred embodiment of a hydraulic machine according to the present invention.
Figure 6:
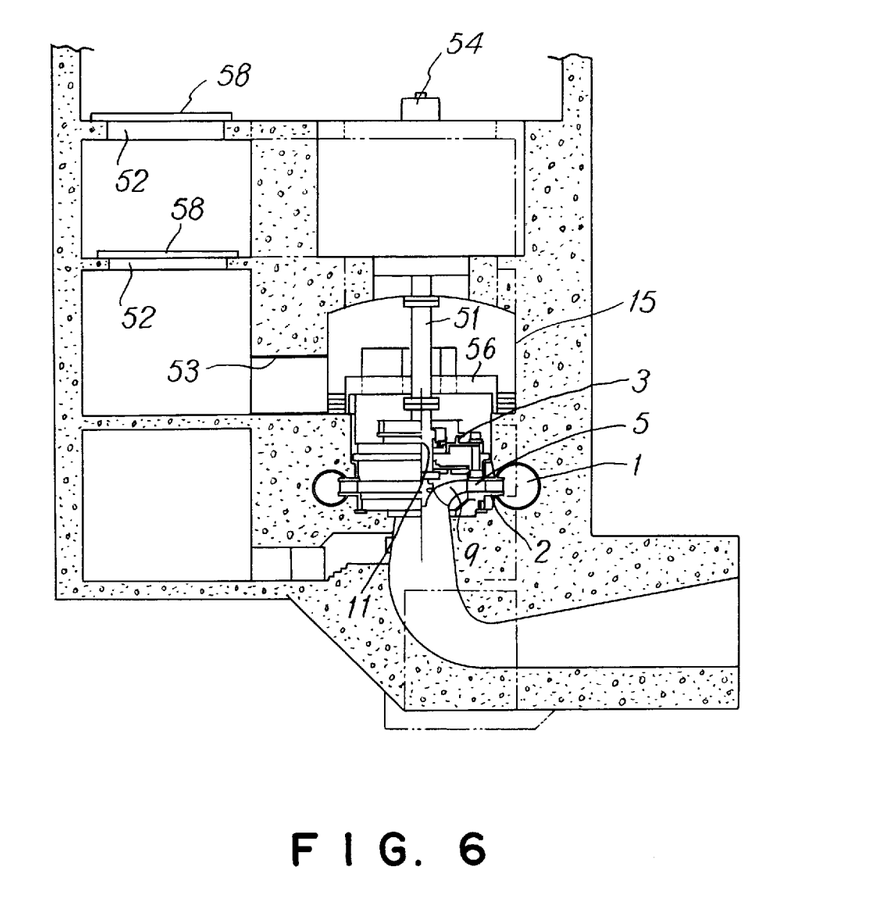
FIG. 6 is a sectional view of the second preferred embodiment of a hydraulic machine according to the present invention, which is taken along line VI—VI of FIG. 5.

Since the pitch circle of the bolts for mounting the head cover 23 is arranged inside of the pitch circle of the guide vane 25, it is possible to make the head cover 23 compact to directly lift the head cover 23 through the upper pit liner 36 if it is formed as an integral structure. Therefore, it is possible to remarkably decrease the term of field installation work, and it is also possible to decrease the manufacturing period of time in a maker. In addition, since the outer diameter of the head cover 23 is decreased, hydraulic pressure applied to the lower portion of the head cover 23 is applied inside of the runner outer-periphery seal, so that it is possible to decrease the pressure and to decrease the quantity of flexure of the head cover 23 due to hydraulic pressure. Furthermore, since the size of the head cover 23 is decreased, the inner diameter of the stay ring 22 is also decreased so that great hydraulic pressure is applied thereto. However, since the outer periphery of the stay ring 22 is embedded in concrete to be firmly fixed thereto, there may be little deformation thereof due to hydraulic pressure in practical use. FIGS. 5 and 6 show the second preferred embodiment of a hydraulic machine according to the present invention. In this embodiment, an intermediate shaft 51 is detachably mounted on the turbine shaft 11 of the conventional hydraulic machine shown in FIG. 15, and a carrying passage 53 extending toward a hatch 52 for introducing the hydraulic machine is formed in the periphery of the lower pit liner 15, so that the disassembled parts of the hydraulic machine can be carried in and out without disassembling the generator 54. That is, as shown in FIG. 6, the intermediate shaft 51 of a predetermined length is detachably mounted on the upper end portion of the turbine shaft 11, and the carrying passage 53 extending toward the hatch 52 for carrying the hydraulic machine is formed in the periphery of the lower pit liner 15. In addition, as shown in FIGS. 7 through 12, a carrying rail 55 is embedded in the lower pit liner 15 and the carrying passage 53. The disassembled parts of the hydraulic machine are treated using a truck 56 and a lifting unit 57, which travel along the carrying rail 55, so that the disassembled parts of the hydraulic machine can be carried without disassembling the generator 54. Furthermore, reference number 58 denotes a hatch cover.

Figure 7:
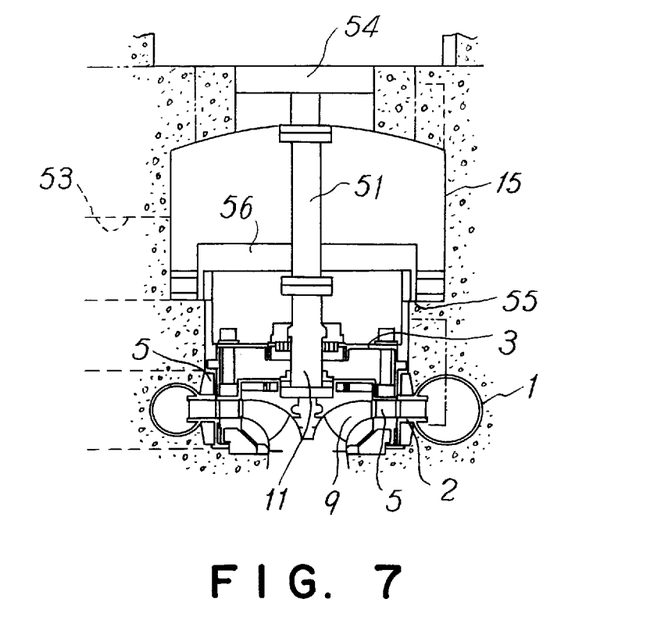
FIG. 7 is an explanatory drawing, which shows the state of the hydraulic machine before being disassembled in a method for disassembling the hydraulic machine as shown in FIG. 6.
Figure 8:
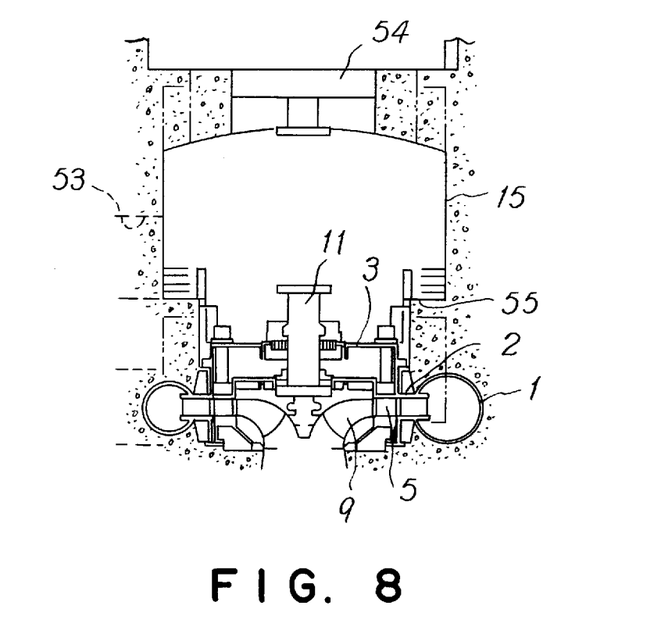
FIG. 8 is an explanatory drawing, which shows the state of the hydraulic machine when an intermediate shaft is removed after the state of FIG. 7.
Figure 9:
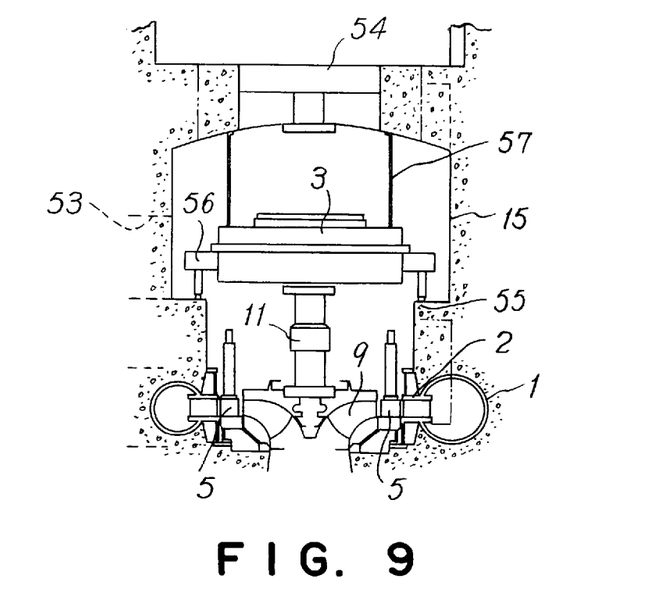
FIG. 9 is an explanatory drawing, which shows the state of the hydraulic machine when a head cover is lifted after the state of FIG. 8.
Figure 10:
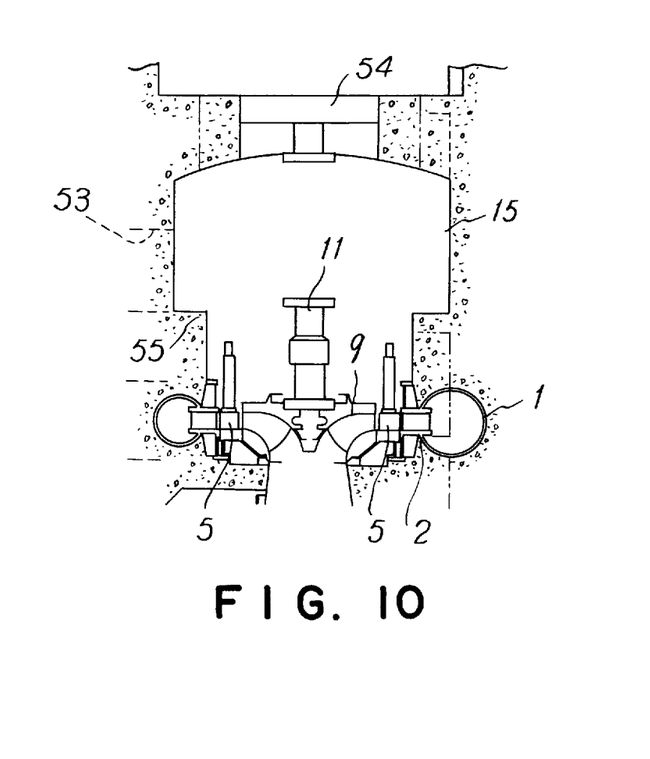
FIG. 10 is an explanatory drawing, which shows the state of the hydraulic machine when the head cover is carried out after the state of FIG. 9.
Figure 11:
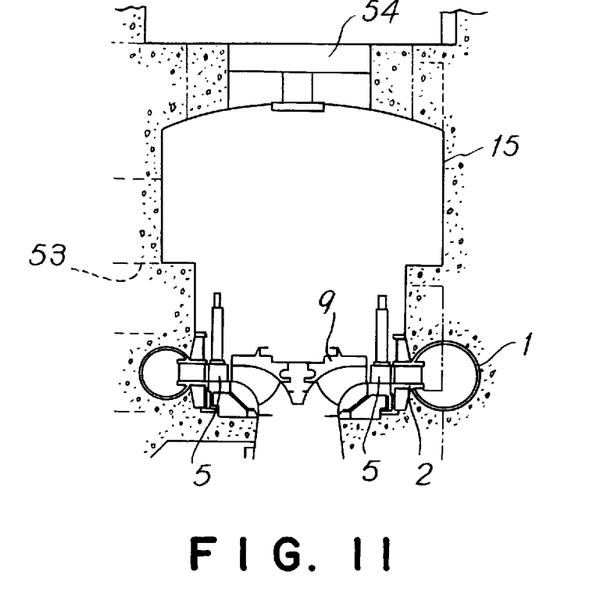
FIG. 11 is an explanatory drawing, which shows the state of the hydraulic machine when a turbine shaft is removed after the state of FIG. 10.
Figure 12:
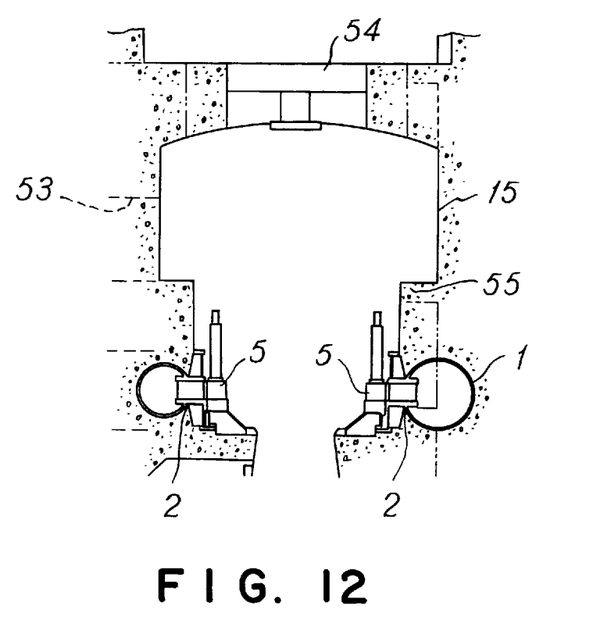
FIG. 12 is an explanatory drawing, which shows the state of the hydraulic machine when a runner is removed after the state of FIG. 11.
Figure 13:
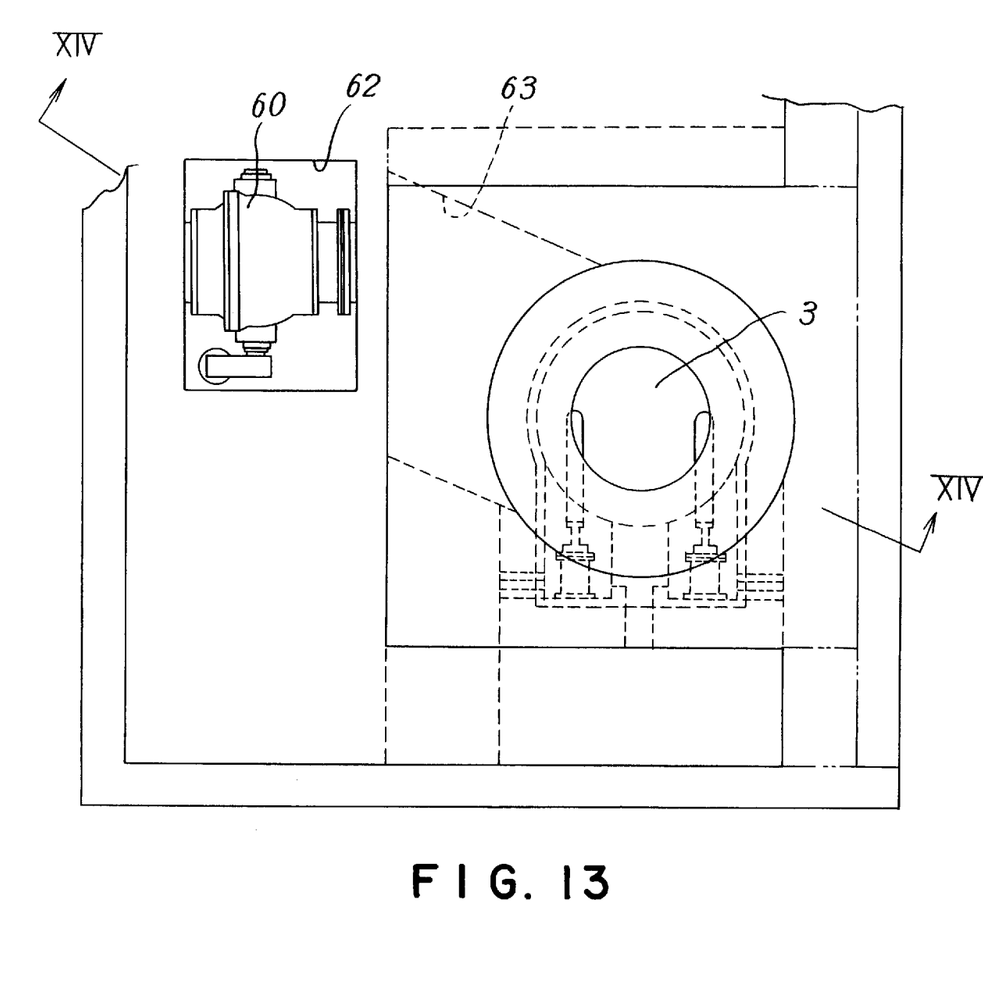
FIG. 13 is a plan view corresponding to FIG. 5, which illustrates the third preferred embodiment of a hydraulic machine according to the present invention.
Figure 14:
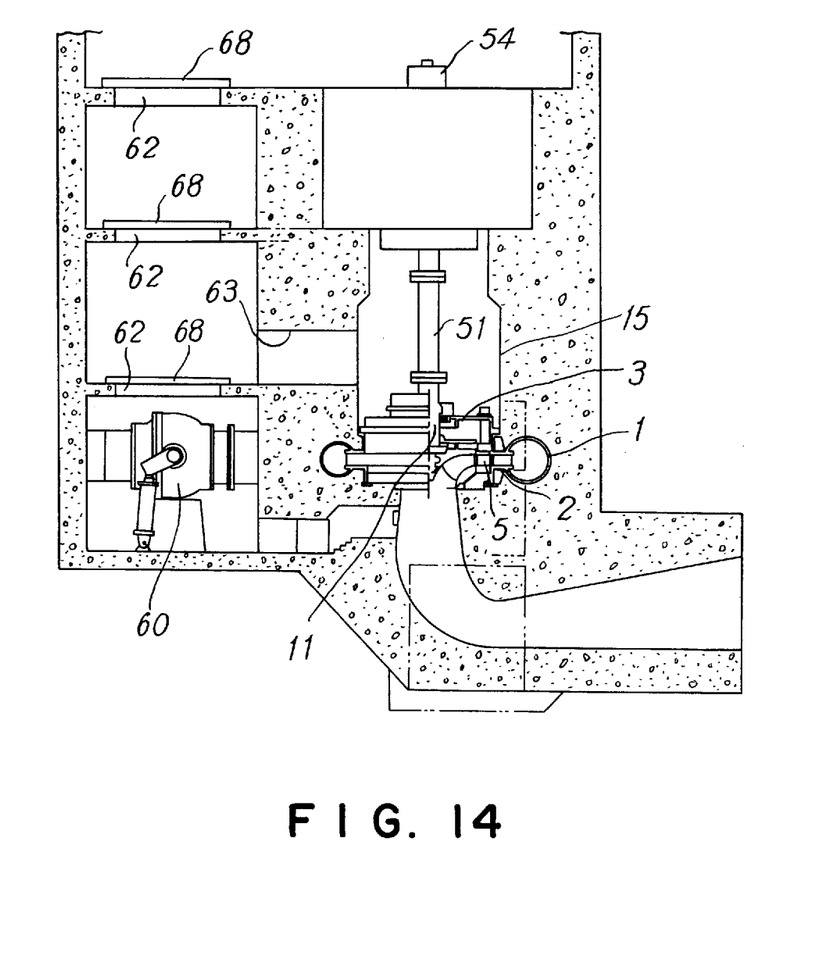
FIG. 14 is a sectional view of the third preferred embodiment of a hydraulic machine according to the present invention, which is taken along line XIV—XIV of FIG. 13.

Operation of this preferred embodiment will be described below. In a case where the hydraulic machine is disassembled and assembled, the intermediate shaft 51 is first removed without removing the generator 54, and the removed intermediate shaft 51 is carried out by means of the truck 56, as shown in FIGS. 7 and 8. Then, the guide vane lever 12, the guide vane link 13 and the operating ring 14 are removed. Thereafter, as shown in FIG. 9, the whole head cover 3 is lifted by means of the lifting unit 57 to be put on the truck 56. Then, the head cover 3 is carried out by means of the truck 56. FIG. 10 shows this state. Then, as shown in FIG. 11, the turbine shaft 11 and the runner 9 are separated from each other, and the turbine shaft 11 is first carried out. Thereafter, as shown in FIG. 12, the runner 9 is carried out. Thus, disassembled state is accomplished. While the disassembly process has been described above, the assembly process is performed in reverse order. Thus, since the intermediate shaft 51 and the carrying passage 53 are provided, it is possible to carry the disassembled parts D of the hydraulic machine without removing the generator 54. Therefore, it is possible to perform disassembly and assembly works for a short term of work similar to a double-flooring type building, while ensuring the strength of a barrel type building. In particular, although the overhaul of a generator may be performed one time about ten years, the overhaul of a hydraulic machine must be one time about three years. Therefore, if the disassembled parts of the hydraulic machine carried without removing the generator 54, there is a great advantage in practical use. In addition, since the strength of a double-flooring type building is weaker than that of a barrel type building, it is hardly applied to a vertical-shaft reversible pump-turbine. In this respect, the present invention has great significance. FIGS. 13 and 14 show the third preferred embodiment of a hydraulic machine according to the present invention. In this embodiment, a hatch 62 and a carrying passage 63 are substituted for the hatch 52 and the carrying passage 53 in the second preferred embodiment, respectively. That is, as shown in FIGS. 13 and 14, the carrying passage 63 extending toward the hatch 62 for carrying an inlet valve 60 is formed in the periphery of the lower pit liner 15. The disassembled parts of the hydraulic machine are conveyed to the hatch 62 through the carrying passage 63, and then, carried to through the hatch 62. In FIG. 14, reference number 68 denotes a hatch cover.

Thus, since the hatch 62 for carrying the inlet valve 60 is provided, it is possible to decrease the building space.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A hydraulic machine installed in a barrel type building, the hydraulic machine comprising:
   a stay ring having a stay vane;
   a head cover arranged on an inner-periphery side of the stay ring;
   a bottom cover arranged on the inner-periphery side of the stay ring;
   a guide vane arranged in a passage between the head cover and the bottom ring, the guide vane having an upper spindle and a lower spindle;
   a runner for converting energy of water flow-required by the guide vane; and
   a shaft rotating with the runner,
   wherein the upper spindle is rotatably supported by a first bearing on the stay ring, and the lower spindle is rotatably supported by a second bearing on the bottom cover.

2. A hydraulic machine as set forth in claim 1, wherein the stay ring is formed with a runner-crown side outer-seal on the inner-periphery thereof.

3. A hydraulic machine as set forth in claim 1, wherein a pitch circle of bolts for mounting the head cover is arranged inside of a pitch circle of the guide vane, and the head cover is connected to the stay ring by bolting.

4. A hydraulic machine as set forth in claim 1, wherein the head cover comprises a bottom plate for defining a runner back-pressure chamber, an upper ring for supporting thereon a guide ring and a bearing stand, and a tapered cylindrical side plate for connecting the bottom plate to the upper ring, and wherein a guide vane arm is provided on the bearing for supporting thereon the upper spindle.

5. A hydraulic machine as set forth in claim 2, wherein a pitch circle of bolts for mounting said head cover is arranged inside of a pitch circle of said guide vane, and said head cover is connected to said stay ring by bolting.

6. A hydraulic machine as set forth in claim 2, wherein said head cover comprises a bottom plate for defining a runner back-pressure chamber, an upper ring for supporting thereon a guide ring and a bearing stand, and a tapered cylindrical side plate for connecting the bottom plate to the upper ring, and wherein a guide vane arm is provided on said bearing for supporting thereon the upper spindle.

7. A hydraulic machine as set forth in claim 3, wherein said head cover comprises a bottom plate for defining a runner back-pressure chamber, an upper ring for supporting thereon a guide ring and a bearing stand, and a tapered cylindrical side plate for connecting the bottom plate to the upper ring, and wherein a guide vane arm is provided on said bearing for supporting thereon the upper spindle.

* * * * *